June 5, 1951 E. N. SUPPLEE 2,555,942
CONVERTED STATION WAGON BODY
Filed Oct. 30, 1947 5 Sheets-Sheet 1
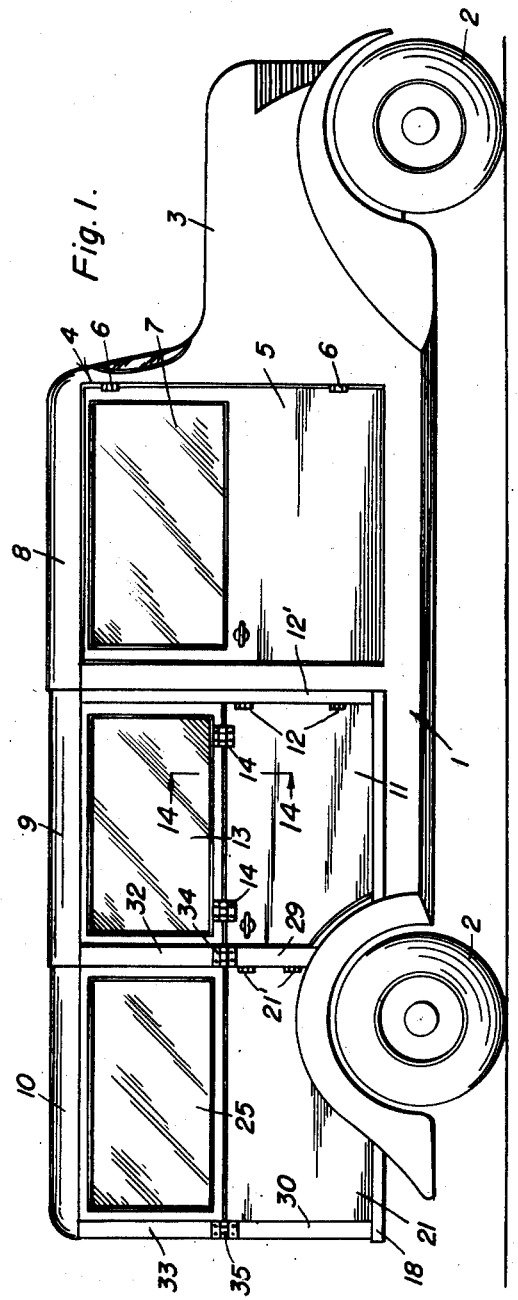
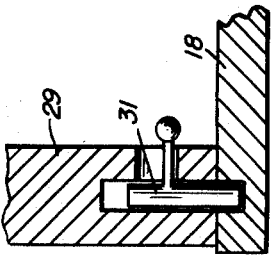
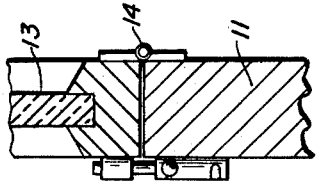
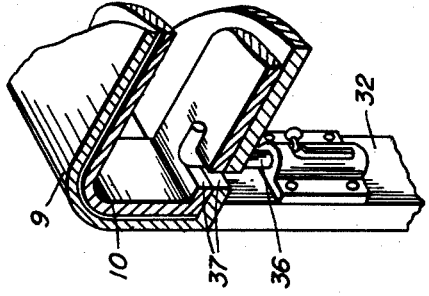
Inventor
Edward N. Supplee
By Clarence A. O'Brien
and Harvey B. Jacobson
Attorneys

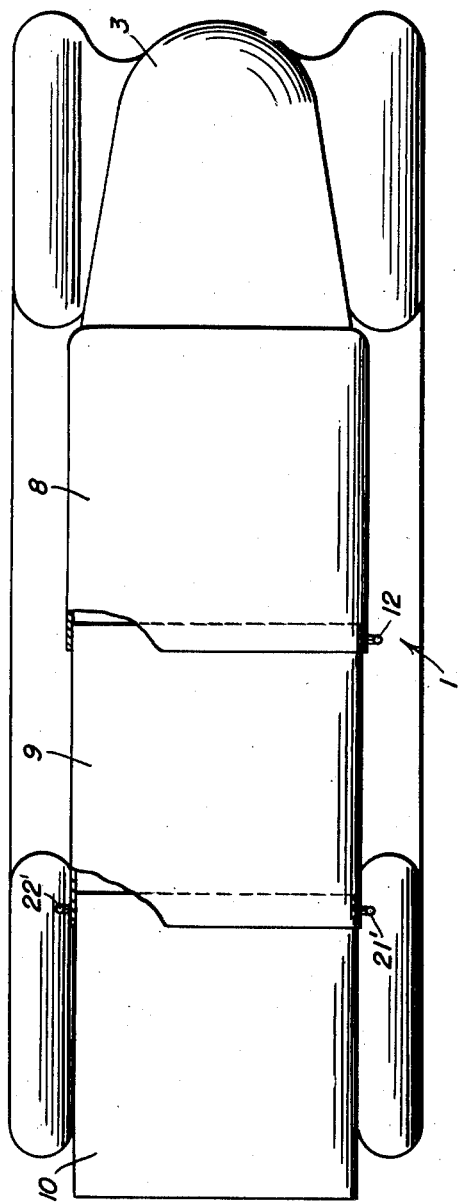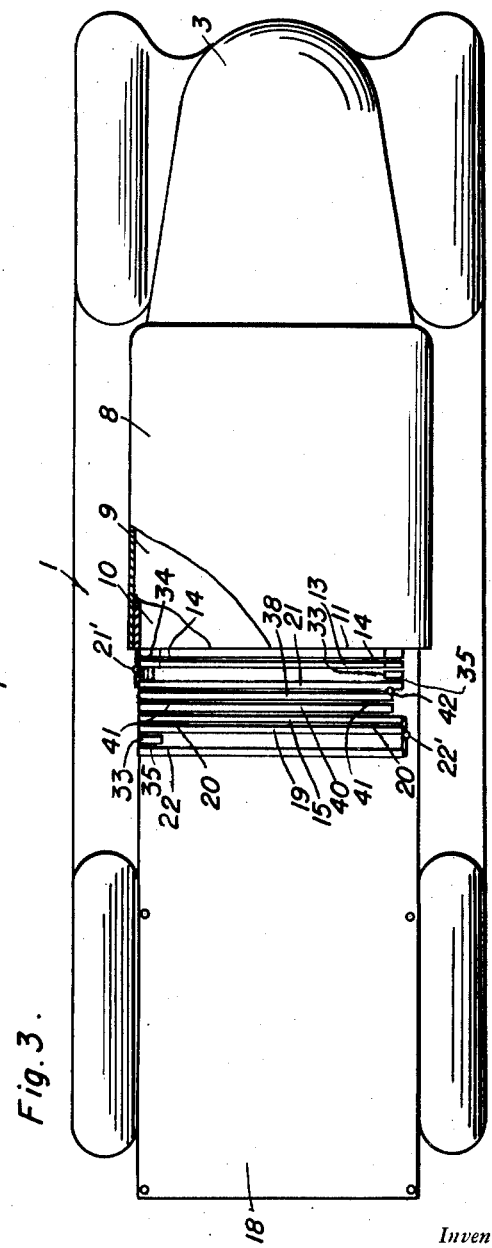

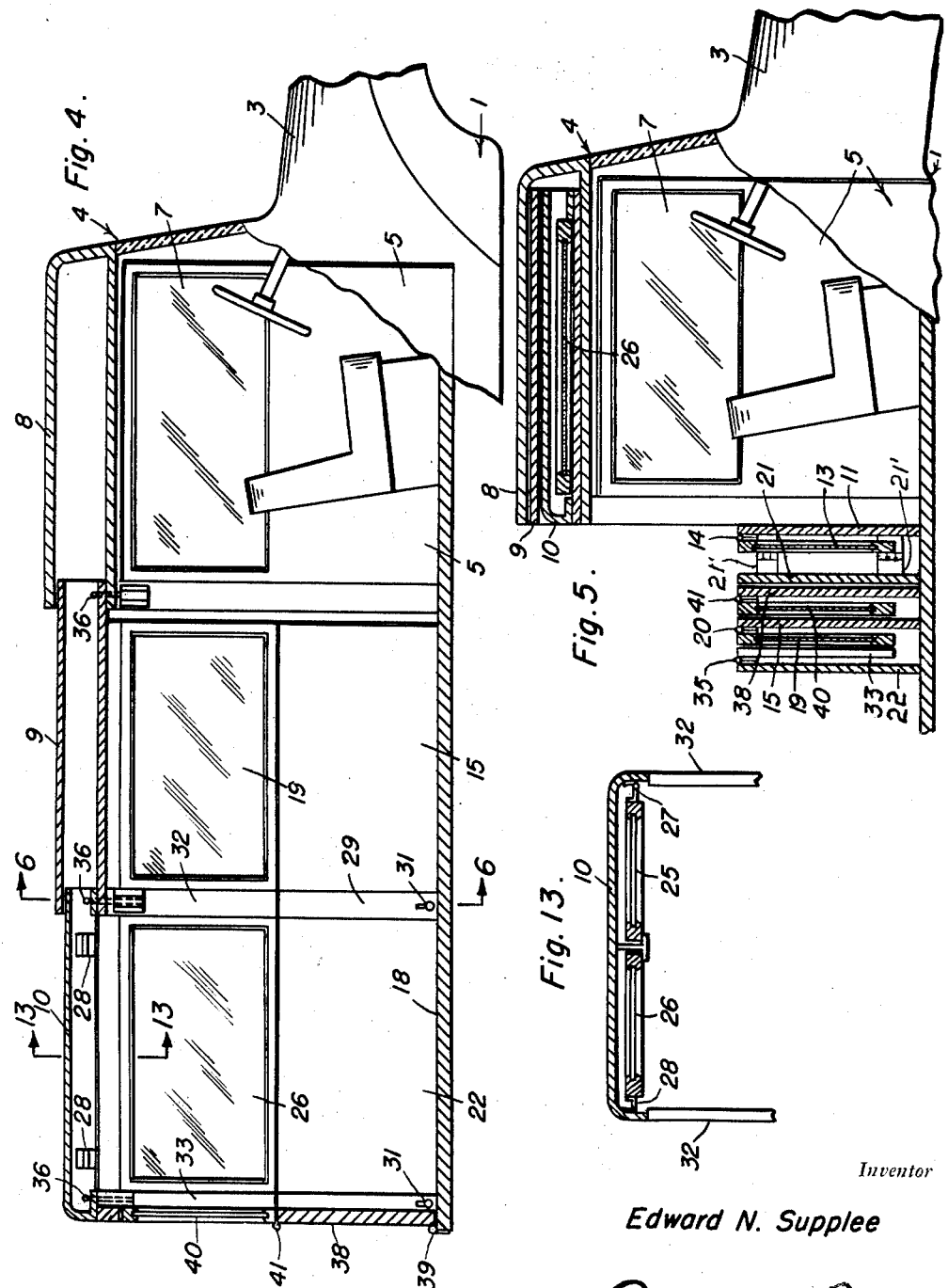

June 5, 1951  E. N. SUPPLEE  2,555,942
CONVERTED STATION WAGON BODY
Filed Oct. 30, 1947  5 Sheets-Sheet 4

Inventor
Edward N. Supplee

By Clarence A. O'Brien
and Harvey B. Jacobson
Attorneys

June 5, 1951      E. N. SUPPLEE      2,555,942
CONVERTED STATION WAGON BODY

Filed Oct. 30, 1947      5 Sheets-Sheet 5

Inventor
Edward N. Supplee

By *Clarence A. O'Brien and Harvey B. Jacobson*
Attorneys

Patented June 5, 1951

2,555,942

UNITED STATES PATENT OFFICE 2,555,942

CONVERTED STATION WAGON BODY

Edward N. Supplee, Lansdowne, Pa.

Application October 30, 1947, Serial No. 782,996

5 Claims. (Cl. 296—27)

This invention relates to improvements in converted station wagon bodies.

An object of the invention is to provide an improved converted stationary wagon body for a motor vehicle.

Another object of the invention is to provide an improved converted station wagon body for a motor vehicle including a front cab having opposed hinged front doors therefor, telescoping roof sections, and removable panels having hinged windows in their upper portions.

A further object of the invention is to provide an improved converted station wagon body for a motor vehicle including a front cab having opposed front hinged doors therefor, telescoping roof sections, removable panels having hinged windows in their upper portions, and one of said panels comprising a hinged rear door having a hinged window in its upper portion.

A still further object of the invention is to provide an improved converted station wagon body for a motor vehicle including a front cab having opposed front hinged doors therefor, telescoping roof sections, removable panels having hinged windows in their upper portions, a panel comprising a hinged rear door having a window hinged in its upper portion, and a tail gate or rear portion having a window hinged in its upper portion.

Another object of the invention is to provide an improved converted station wagon body for a motor vehicle which will be highly efficient in use, and relatively inexpensive to manufacture and produce.

Other objects will appear as the description proceeds.

In the accompanying drawings which form a part of this application,

Figure 1 is a side elevation of a motor vehicle provided with the improved converted station wagon body;

Figure 2 is a top plan view of a motor vehicle provided with the improved converted station wagon body shown in extended position with the same partly broken away to show the telescoping roof sections;

Figure 3 is a top plan view of a motor vehicle provided with the improved converted station wagon body showing the same in knock-down or folded position and partly broken away and in section to show the telescoped roof sections;

Figure 4 is a vertical longitudinal sectional view through the station wagon body when in assembled or extended position;

Figure 5 is a vertical longitudinal sectional view through the station wagon body when in knock-down and telescoped position;

Figure 11 is an enlarged detailed perspective view of one of the top locking latches used for securing a stake to a roof section;

Figure 12 is an enlarged detailed perspective view of the lower locking latches used for securing the side panels to the bottom of the converted station wagon body;

Figure 13 is a sectional view taken on the line 13—13 of Figure 4; and,

Figure 14 is an enlarged detail vertical sectional view taken on the line 14—14 of Figure 1.

Like characters of reference are used throughout the following specification and the accompanying drawings to designate corresponding parts.

Figure 6:
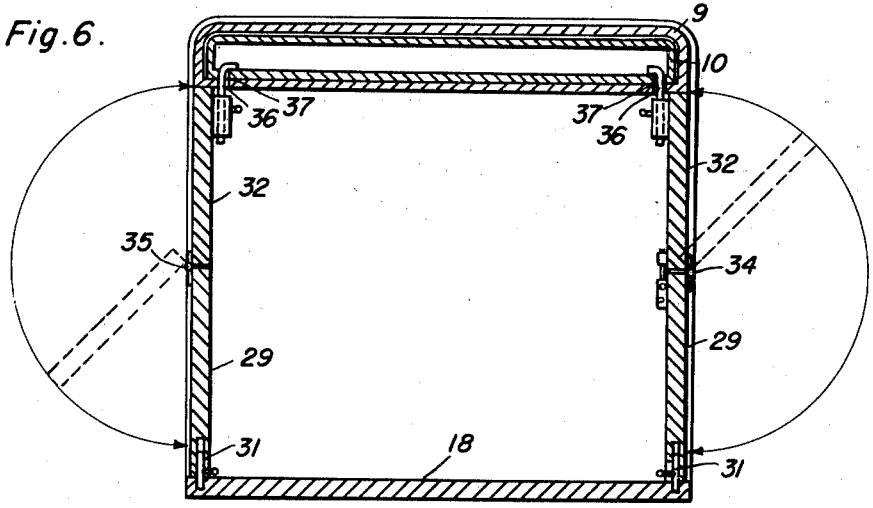
Figure 6 is a sectional view taken on the line 6—6 of Figure 4.

In carrying out the invention, there is shown and provided a motor vehicle generally designated by the reference numeral 1 having rubber tired wheels 2, a hood 3 and cab 4 having opposite doors 5 hinged at 6. Suitable windows 7 will be provided for the upper portions of said doors 5.

The improved converted station wagon body includes the hollow cab roof section 8, an intermediate hollow roof section 9 telescopically receivable in the hollow cab roof section 8 and a rear hollow roof section 10 telescopically receivable in the intermediate hollow roof section 9, all of said sections being telescoped together and housed within the hollow cab roof section 8 when the converted station wagon body is in knocked down or collapsed position.

A rear door panel 11 is hinged at 12 to a post 12' at the rear edge of the cab 4 for outward movement and supports an upper window portion 13 hinged at 14 to the upper edge of said door panel 11.

Figure 7:
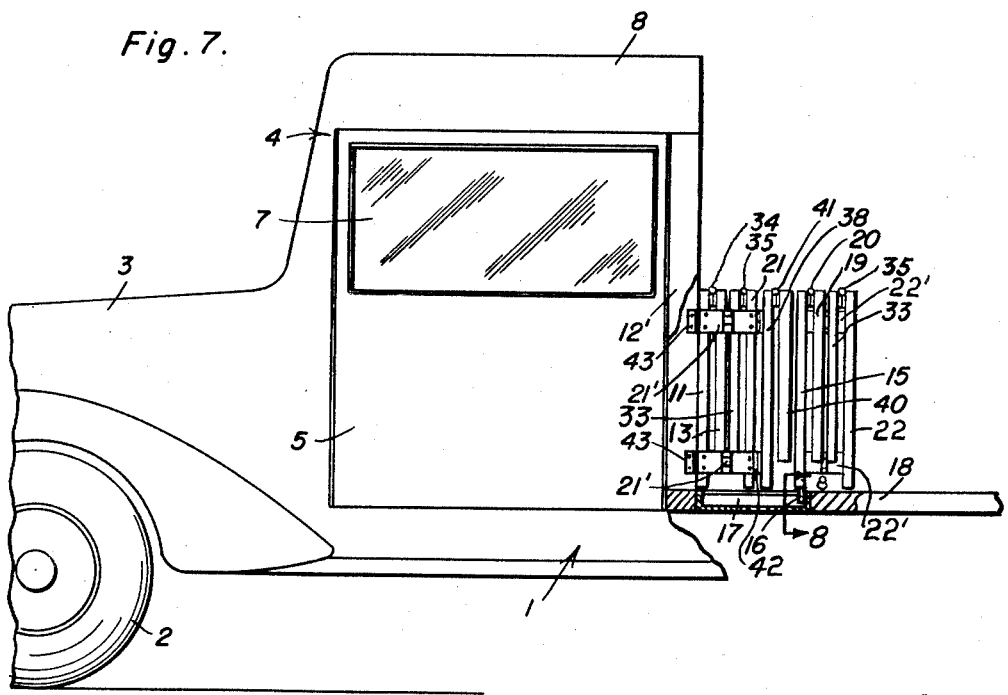
Figure 7 is a side elevation of the cab portion and the front end of a motor vehicle showing the panels and hinged windows in knock-down or folded position.
Figure 8:
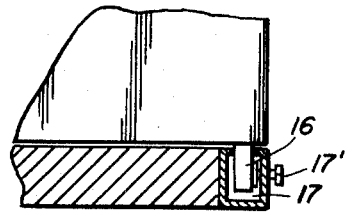
Figure 8 is a detailed sectional view taken on the line 8—8 of Figure 7.
Figure 9:
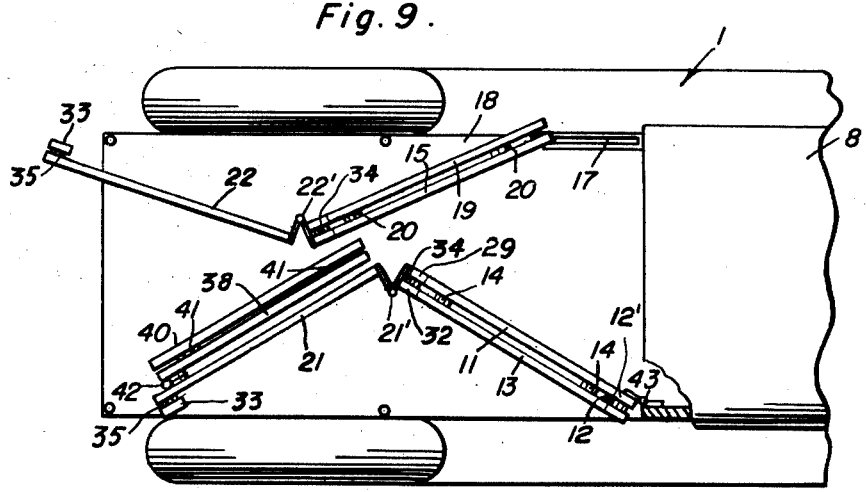
Figure 9 is a plan view of the rear portion of a motor vehicle provided with the improved converted station wagon body showing the same in partially knocked down or collapsed position.
Figure 10:
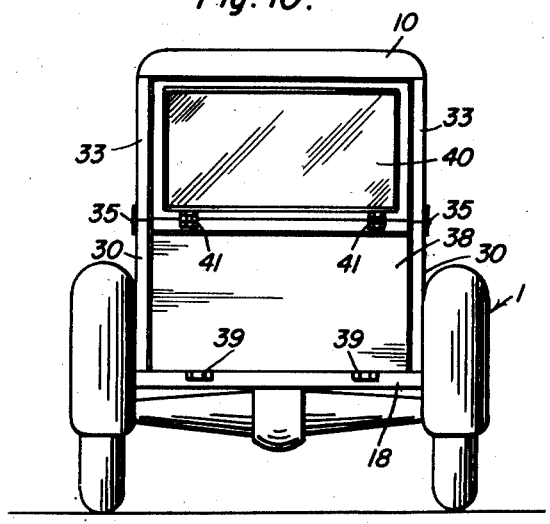
Figure 10 is a rear elevation of a motor vehicle provided with the improved converted station wagon body showing the tail gate or rear panel construction therefor.

A front panel 15 is provided with a depending guide pin 16 in its lower end, being slidably and adjustably supported in the slot 17 formed in the bottom 18 of the motor vehicle 1, and cooperates with a locking set screw 17' which will be tightened when the converted station wagon body is in knocked down position. The guide pin 16 will be disposed in the front end of said slot 17 when the station wagon body is assembled, and it will be disposed in the rear end of the slot when the station wagon body is knocked down and bolted, as shown in Figures 7 and 9 of the drawings.

An upper window portion 19 is hinged at 20 to the upper edge of said front panel 15.

Rear side panels 21 and 22 are hinged at 21' and 22' to the rear edges of the stakes 29 which swing with rear door panel 11 and front panel 15 into collapsed position, and cooperate with the upper window portions 25 and 26 which are hinged at 27 and 28 for folding up into the hollow rear roof section 10 when the converted station wagon body is knocked down.

Intermediate and rear stakes 29 and 30 are secured to the bottom 18 of the motor vehicle 1 by means of the sliding latch bolts 31, and have their upper portions 32 and 33 hinged at 34 and 35 to the upper ends of the stakes 29 and 30. The upper portions 32 and 33 are provided with slidable hook end fasteners 36 in their upper ends for cooperating with the locking slots 37 formed in the several roof sections 8, 9 and 10. Panels 21 and 22 are hinged at 21' and 22' to the stakes 29 for holding the same when being knocked down.

A rear panel or tail gate 38 is provided, and is hinged at 39 to the rear end of the bottom 18 of the motor vehicle 1, and is provided with an upper window portion 40 hinged at 41 thereto, and is also hinged at 42 to the rear side portion 21 and is foldable against the same when the hinges 39 are freed from the bottom 18 of the motor vehicle 1. Obviously, when the hinges 42 are disconnected from the rear side portion 21, the tail gate 38 may be dropped downwardly and used as such.

Hinges 43 will be connected between the rear door panel 11 and the front body stake 12' disposed adjacent the cab 4, whereby the panel 11 may be swung inwardly to lie next to the back of the cab 4 when the body is in knocked down position.

From the foregoing description, it will be apparent that when it is desired to knock down the body of the converted station wagon, it will be only necessary to unloosen the several lower fasteners 31 and the upper fasteners 36, whereupon the front door panel 11 with the rear side panel 21 hinged thereto, together with the tail gate panel 38 may be folded in parallel relation directly behind the back of the cab 4. The front panel 15 will then be slid rearwardly until the depending pin 16 is disposed in the rear end of the slot 17, and is fastened in this position by means of the locking set screw 17', whereupon the rear side panel 22 may be folded together with the front panel 15 to lie in parallel relation immediately behind the first mentioned panels, as clearly illustrated in Figures 3, 5 and 7 of the drawings.

When the several panels and their hinged window portions have been disposed in folded position immediately to the rear of the cab 4, the window portions 25 and 26 for the rear side portions 21 and 22 will be folded up within the hollow rear roof portion 10 which will be telescoped within the intermediate hollow roof section 9, which will be telescoped within the hollow cab roof section 8, thereby completing the dismantling and knocking down of the converted station wagon body.

From the foregoing description, it will be apparent that there has been devised and provided a highly efficient form of converted station wagon body which may be readily assembled or dismantled and knocked down at will, and which may be manufactured and produced at a relatively low cost.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. In a vehicle of the type having a permanent cab and a permanent platform extending rearwardly from the cab on a level with the floor thereof, a pocket in the roof of said cab opening through the rear end thereof, a hollow roof section telescopically entering the open end of the pocket in the cab roof, a second hollow roof section telescopically entering the end of the first mentioned hollow roof section remote from the cab, hingedly connected side panels hinged to the cab adjacent the rear end thereof for swinging movement over the platform and including a rear pair of side panels, said rear pair of side panels having window openings and sashes hinged to the hollow roof section remote from the cab for entrance into the window openings when the panels are extended, means for locking the sashes in the window openings and against swinging movement, and means securing the side panels to the roof sections to support the roof sections above and between the side panels.

2. In a vehicle of the type having a permanent cab and a platform extending rearwardly from the cab on a level with the floor thereof, a pocket in the roof of said cab opening through the rear end thereof, a hollow roof section telescopically entering the open end of the pocket in the cab roof, a second hollow roof section telescopically entering the end of the first mentioned hollow roof section remote from the cab, a first group of panels including a forward panel and a rear panel, a first hinge securing the rear panel of the first group of side panels to the forward panel of the first group of panels whereby the rear panel may be folded against the forward panel, a second hinge securing the forward panel to the cab adjacent the rear end thereof for swinging movement of the forward panel in a horizontal plane toward the cab, a second group of panels including a forward panel and a rear panel, a third hinge securing the rear panel of the second group of panels to the forward panel of the second group of panels whereby the rear panel may be folded against the forward panel, a guide track mounted on the platform, a pin carried by the forward panel of the second group of panels slidably and rotatably received in said guide track for placement of the forward panel of the second group of panels against the rear panel of the first group of panels when the forward and rear panels of the first group of panels are folded against each other, and bolts carried by the panels of both groups of panels and entering the roof sections to detachably secure the roof sections to the groups of panels and hold the roof sections and groups of panels extended.

3. In a vehicle of the type having a permanent cab and a platform extending rearwardly from the cab on a level with the floor thereof, a pocket in the roof of said cab opening through the rear end thereof, a hollow roof section telescopically entering the open end of the pocket in the cab roof, a second hollow roof section telescopically entering the end of the first mentioned hollow roof section remote from the cab, a first pair of panels including forward and rear side panels, a first hinge joining said first pair of forward and rear side panels for horizontal swinging movement of the rear side panel against the forward side panel, a second hinge securing the forward side panel to the cab adjacent the rear end thereof for horizontal swinging movement of the forward panel inwardly and forwardly toward the cab, a second pair of panels including forward and rear side panels, a third hinge joining the forward and rear side panels of said second pair of panels for swinging movement of the rear side panel of said second pair of panels against the forward panel of said second pair of panels, means slidably and pivotally securing said forward panel of said second pair of panels to said platform for horizontal swinging movement of the second pair of panels inwardly and forwardly toward the cab and against the first pair of panels, and means for detachably securing the panels of both pairs of panels to the roof sections to hold the roof sections and side panels extended.

4. The combination of claim 3 wherein each panel of said pairs of panels includes an upper section and a lower section, and hinge members between the upper and lower sections for vertical swinging movement of the upper section relative to the lower section.

5. In a vehicle of the type having a permanent cab and a platform extending rearwardly from the cab on a level with the floor thereof, a pocket in the roof of said cab opening through the rear end thereof, a hollow roof section telescopically entering the open end of the pocket in the cab roof, a second hollow roof section telescopically entering the end of the first mentioned hollow roof section remote from the cab, a first pair of panels including forward and rear side panels, a first hinge joining said first pair of forward and rear side panels for horizontal swinging movement of the rear side panel against the forward side panel, a second hinge securing the forward side panel to the cab adjacent the rear end thereof for horizontal swinging movement of the forward panel inwardly and forwardly toward the cab, a second pair of panels including forward and rear side panels, a third hinge joining the forward and rear side panels of said second pair of panels for swinging movement of the rear side panel of said second pair of panels against the forward panel of said second pair of panels, means slidably and pivotally securing said forward panel of said second pair of panels to said platform for horizontal swinging movement of the second pair of panels inwardly and forwardly toward the cab and against the first pair of panels, means for detachably securing the panels of both pairs of panels to the roof sections to hold the roof sections and side panels extended, each panel of said pairs of panels including an upper section and a lower section, hinge members between the upper and lower sections and arranged to permit vertical swinging movement of the upper sections relative to the lower sections, means for locking the upper sections raised above the lower sections, a tail panel having upper and lower sections, means hinging the upper section of the tail panel to the lower section of the tail panel for vertical swinging movement of the upper section of the tail panel against the lower panel of the tail panel, further means hinging the lower section of the tail panel to the rear panel of the first pair of panels for horizontal swinging movement of the tail panel against the rear panel of the first pair of panels, and means for detachably hinging the lower section of the tail panel to the platform.

EDWARD N. SUPPLEE.

REFERENCES CITED

The following references are of record in the file of this patent:

UNITED STATES PATENTS

| Number | Name | Date |
|---|---|---|
| 312,785 | Wyman | Feb. 24, 1885 |
| 1,015,146 | Davis et al. | Jan. 16, 1912 |
| 1,207,266 | Bartholomew | Dec. 5, 1916 |
| 1,267,793 | Oliver | May 28, 1918 |
| 1,306,836 | Perlman | June 17, 1919 |
| 1,479,258 | Simons | Jan. 1, 1924 |
| 1,610,466 | Oversmith | Dec. 14, 1926 |
| 1,790,379 | Hughes | Jan. 27, 1931 |
| 2,127,580 | Bartholowsky | Aug. 23, 1938 |

FOREIGN PATENTS

| Number | Country | Date |
|---|---|---|
| 382,446 | Great Britain | Oct. 27, 1932 |